United States Patent [19]
Naldi

[11] Patent Number: 5,997,454
[45] Date of Patent: *Dec. 7, 1999

[54] PANEL CUTTING MACHINE

[75] Inventor: Valter Naldi, Via Longo, Italy

[73] Assignee: Selco S.r.l., Pesaro, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/730,723

[22] Filed: Oct. 11, 1996

[30] Foreign Application Priority Data

Oct. 11, 1995 [IT] Italy .................. B095A0482

[51] Int. Cl.⁶ .................. B23Q 3/157; B65G 1/12; B26D 1/18
[52] U.S. Cl. .................. 483/36; 483/38; 483/68; 83/485; 83/954
[58] Field of Search .................. 83/485, 954, 549, 83/552, 859, 701; 483/58, 60, 68, 22, 23, 24, 25, 900, 901, 902, 36, 38

[56] References Cited

U.S. PATENT DOCUMENTS

| | | | |
|---|---|---|---|
| 4,019,246 | 4/1977 | Tomita et al. | 483/60 X |
| 4,831,721 | 5/1989 | Hirai et al. | 483/902 X |
| 4,907,337 | 3/1990 | Krusi | 83/471.3 X |
| 4,925,348 | 5/1990 | Krusi | 409/231 |
| 5,179,883 | 1/1993 | Payr | 83/485 X |
| 5,287,786 | 2/1994 | Fiala | 83/13 X |
| 5,476,436 | 12/1995 | Klicpera | 483/68 |
| 5,688,084 | 11/1997 | Fritz et al. | 483/58 X |

FOREIGN PATENT DOCUMENTS

| | | |
|---|---|---|
| 0267156 | 5/1988 | European Pat. Off. . |
| 2013403 | 10/1971 | Germany .................. 483/68 |
| 3326292 | 1/1985 | Germany . |
| 9113684684 | 12/1991 | Germany . |
| 50711 | 12/1972 | Japan .................. 483/68 |
| 71748 | 5/1982 | Japan .................. 483/900 |
| 48303 | 3/1983 | Japan .................. 83/485 |
| 48804 | 4/1988 | Japan .................. 483/68 |

OTHER PUBLICATIONS

Patent Abstracts of Japan, vol. 9, No. 70 (M–367), Mar. 30, 1985 and JP–59201714 (Mitsubishi Jokogyo KK), Nov. 15, 1984, Abstract; Figs. 1–7.

Primary Examiner—Rinaldi I. Rada
Assistant Examiner—Charles Goodman
Attorney, Agent, or Firm—Lowe Hauptman Gopstein Gilman & Berner

[57] ABSTRACT

A machine for cutting panels, the substantially horizontal worktable of which supports the panels and presents a lateral guide extending in a given direction; the guide supporting a carriage presenting at least one cutting member; the carriage being movable in freely-sliding manner in the aforementioned direction to cut the panels by means of a cutting member; clamping means being provided over the worktable to clamp the panels during cutting; a store containing further cutting members being provided to the side of the worktable; and a device for picking up the cutting members being provided between the carriage and the store to replace a cutting member on the carriage with a cutting member from the store.

14 Claims, 4 Drawing Sheets ns 5,997,454

PANEL CUTTING MACHINE

BACKGROUND OF THE INVENTION

The present invention relates to a panel cutting machine.

Known machines for cutting large flat panels from which to produce shelves or similar feature a worktable defined at the top by a substantially flat, horizontal surface, and presenting a straight lateral guide parallel to the substantially flat surface and supporting in sliding manner a carriage fitted with a cutting assembly for cutting the panel parallel to the direction of said lateral guide.

The cutting assembly normally features a pair of circular saws of different diameters and defining a cutting plane perpendicular to the substantially flat surface; the carriage is fitted with a spindle for each circular saw, which is fitted coaxially to a toolholder body, the shank of which is housed inside the respective spindle; the first of the two saws in the traveling direction of the carriage is a notching tool for preparing the panels for the actual cutting operation; and the second saw completes the cutting of the panels, and therefore presents a larger diameter than the first one.

To change the tools when no longer suitable for use, the machine operator, after first locking the machine and resetting the carriage to the idle position, takes the tool-clamping flange off the respective spindle; takes the saw off the respective toolholder; fits the new saw on to the toolholder; fits the tool-clamping flange back on to the respective spindle; and then starts the machine up again. Each of the above operations therefore involves a fair amount of downtime, which seriously impairs the output of the machine.

SUMMARY OF THE INVENTION

It is an object of the present invention to provide a cutting machine designed to overcome the aforementioned drawbacks, and which provides for considerably reducing downtime for retooling the machine.

According to the present invention, there is provided a machine for cutting panels and featuring pressure clamping devices for clamping the panels; the machine comprising a frame presenting a substantially horizontal worktable, and a guide extending to the side of said frame in a given substantially horizontal direction; and a carriage fitted in freely-sliding manner to said guide so as to move, in relation to said frame, to and from an idle position wherein said carriage is located laterally in relation to said worktable; said carriage housing in freely-rotating and axially-fixed manner at least one supporting element presenting a respective first longitudinal axis perpendicular to said direction; and said supporting element supporting at least one cutting member presenting a circular saw; machine characterized by comprising a transfer station located to the side of said worktable and substantially facing said idle position; pickup means located at said transfer station and for automatically replacing a damaged cutting member with a new cutting member; and actuating means cooperating selectively with said supporting element and with said pickup means, for selectively releasing said cutting member from said supporting element and enabling replacement of said cutting member.

BRIEF DESCRIPTION OF THE DRAWINGS

A non-limiting embodiment of the present invention will be described by way of example with reference to the accompanying drawings in which.

DETAILED DESCRIPTION OF THE INVENTION

Figure 1:
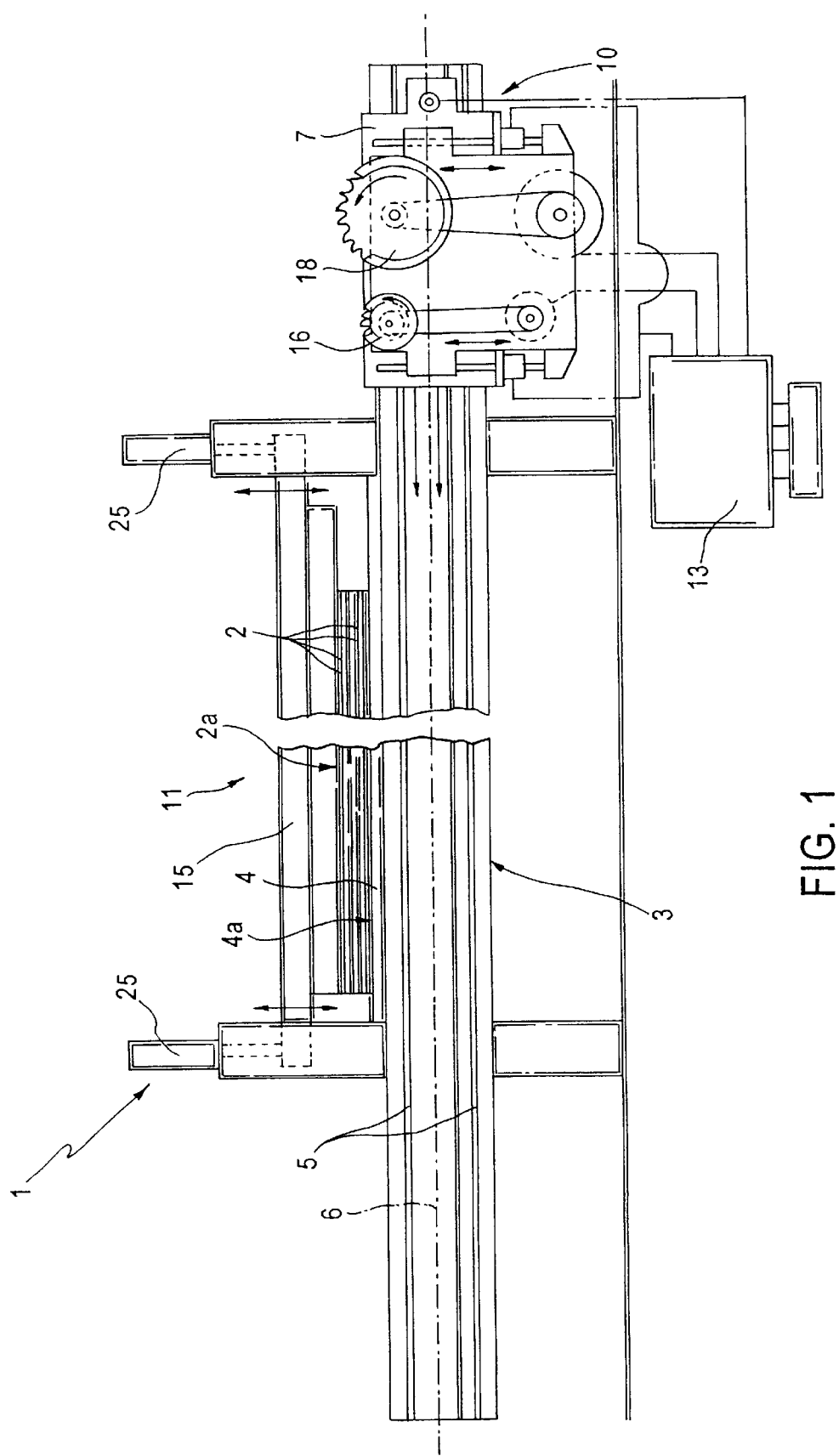
FIG. 1 shows a schematic front view of a machine in accordance with the present invention.

Number 1 in FIG. 1, in which only the parts pertinent to the present invention are numbered, indicates a machine for cutting single panels 2 or packs 2a of panels 2, each of which is preferably, but not necessarily, flat and rectangular, and is made, for example, of wood, aluminium, plastic, or epoxy resin.

Machine 1 comprises a frame 3 presenting a rectangular worktable 4 defined at the top by a flat, substantially horizontal surface 4a and in turn presenting, laterally, two straight guides 5 extending in a given direction 6 parallel to one side of and beneath worktable 4.

Figure 2:
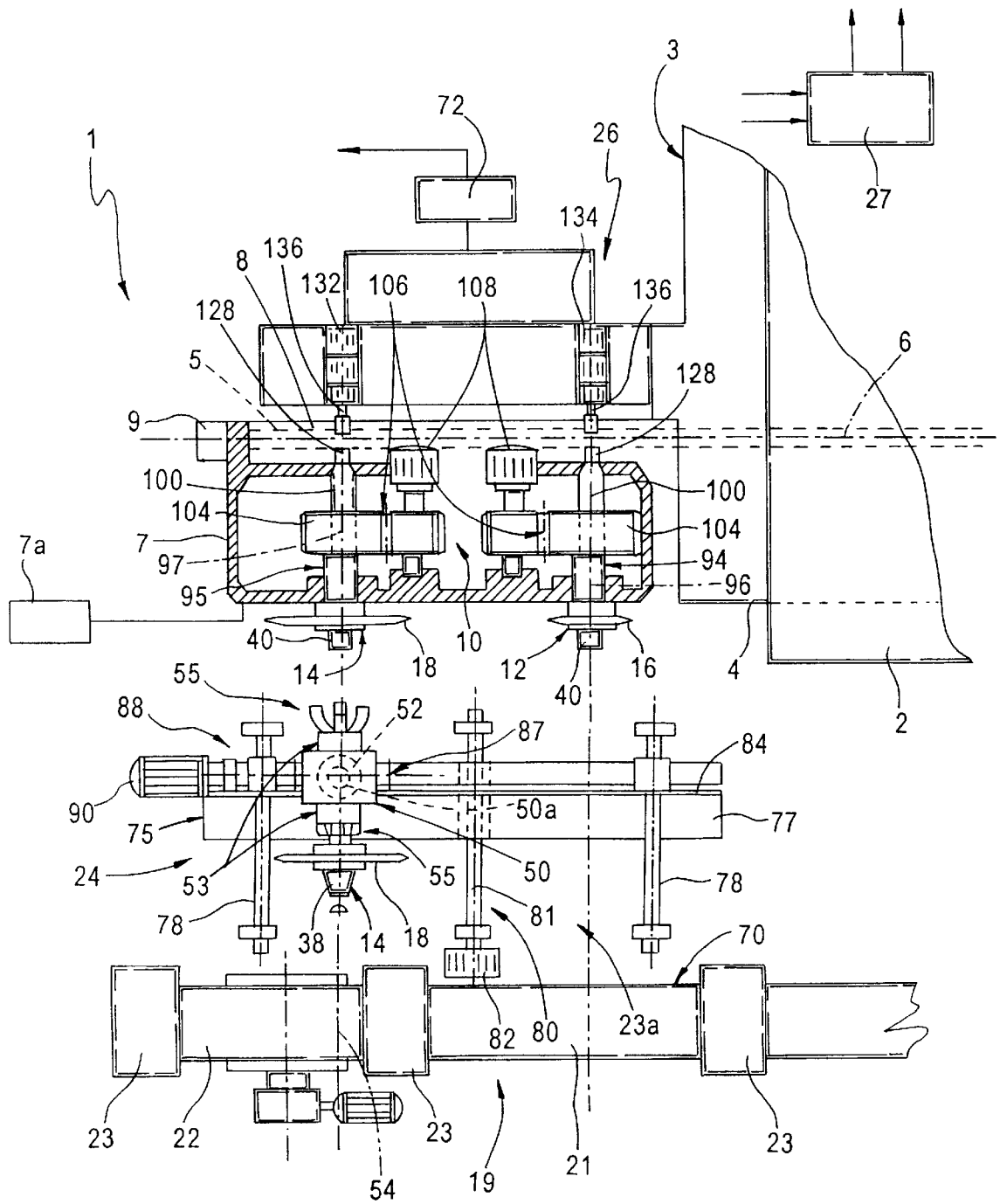
FIG. 2 shows a larger-scale, partially sectioned, schematic plan view of a portion of the FIG. 1 machine.

With reference to FIGS. 1 and 2, machine 1 also comprises a box carriage 7 presenting a slide 8 fitted in freely-sliding manner to guide 5 so that, by means of an actuating assembly 7a (FIG. 2), carriage 7 is movable along guide 5 to and from an idle position in which slide 8 contacts a limit stop 9 fitted to the end of guide 5 on the opposite side to worktable 4. Carriage 7 also presents a cutting assembly 10 (described in detail later on) supporting a first and second toolholder body 12 and 14, each fitted integrally with a circular saw 16, 18 as described later on.

With reference to FIG. 1, frame 3 presents a clamping device 11 located over worktable 4 and for firmly clamping panel 2 or pack 2a of panels 2 in the cutting position. Clamping device 11 presents a bar 15 extending in direction 6 and movable, by means of linear actuators 25 and perpendicularly to surface 4a, to and from a position contacting the top panel 2 in pack 2a on worktable 4. Linear actuators 25 are fitted to frame 3 on the opposite side of worktable 4 to guide 5, present respective longitudinal axes substantially perpendicular to surface 4a, and therefore provide for moving bar 15 vertically (i.e. perpendicularly to direction 6) to and from the contacting position, in which they act as thrust members for exerting sufficient downward pressure to clamp panels 2 in the cutting position.

Figure 3:
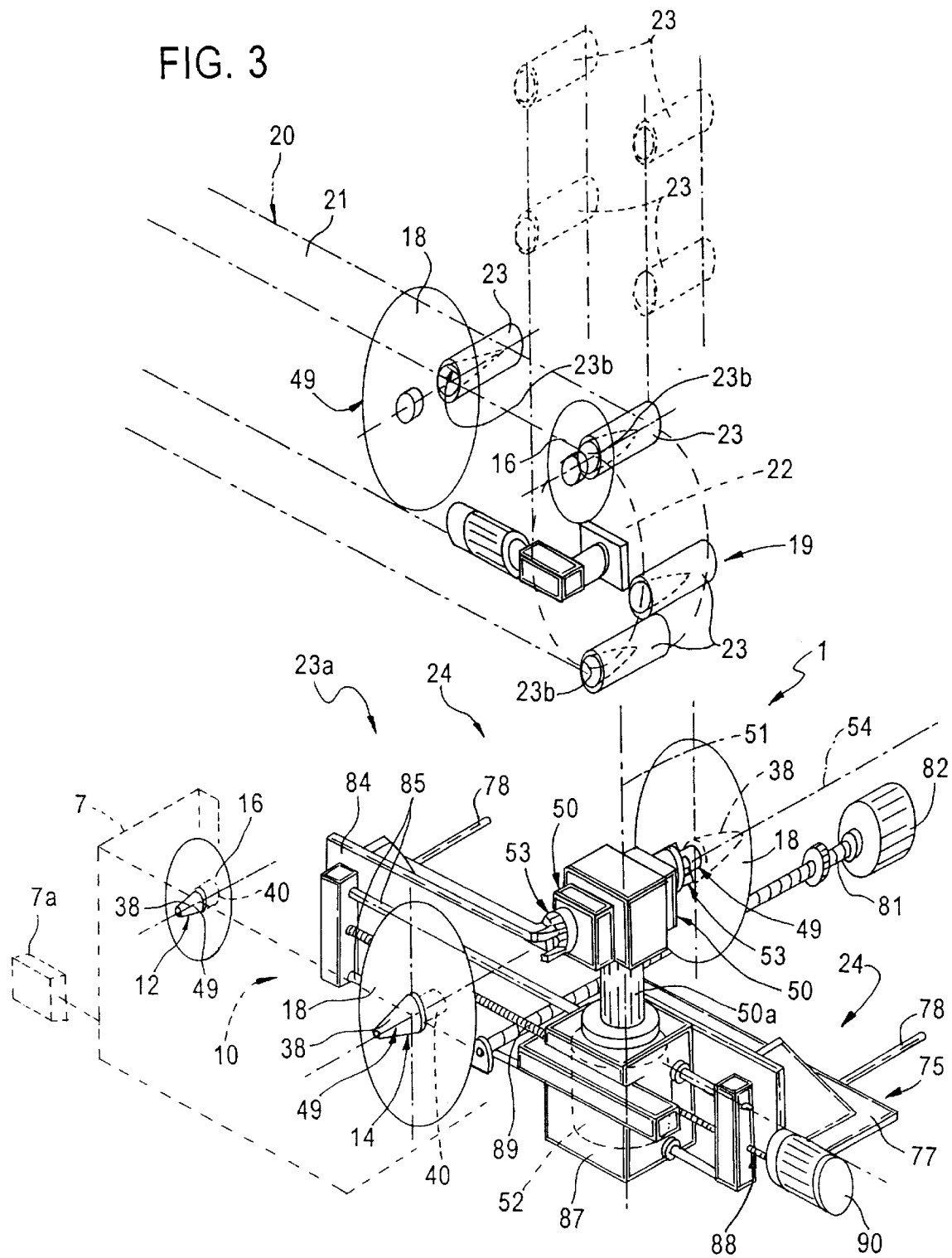
FIG. 3 shows a larger-scale view in perspective, with parts removed for clarity, of FIG. 2.

With reference to FIGS. 2 and 3, machine 1 comprises a store 19 facing carriage 7 and worktable 4, and comprising a pocket conveyor 20 extending parallel to guide 5 and presenting a belt 21 looped about two pulleys 22 (only one shown in FIGS. 2 and 3). Conveyor 20 presents a number of hollow pockets 23 equally spaced with a given spacing parallel to direction 6, and open on the carriage 7 side to receive said bodies 12 and 14 perpendicularly to direction 6 at a transfer station 23a defined at the front by store 19, at the rear by carriage 7 in the idle position, and laterally by worktable 4. As will be appreciated from the following, belt 21 may be operated in a step-wise manner.

At station 23a, machine 1 comprises a tool-change device 24 for automatically removing bodies 12 and 14 one at a time from cutting assembly 10 and inserting them inside a seat 23b in a respective pocket 23, or vice versa.

On the opposite side of guide 5 to device 24, machine 1 also comprises a control unit 26 (described in detail later on) which cooperates with cutting assembly 10 and with device 24 for changing toolholder bodies 12 and 14.

Saw 16, 18 presents a central hole by which it is centered on respective body 12, 14, and a number of holes equally spaced about the central hole; and, to support saw 16, 18 integrally, body 12, 14 presents a substantially cylindrical central portion 36 (FIG. 4) for the central hole of saw 16, 18, and two end portions 38 and 40 coaxial with each other and with saw 16, 18. More specifically, whereas portion 40 is substantially cylindrical, portion 38 is conical and presents an integral pin 41 with a mushroom-shaped free end 41a. Between portions 36 and 38, body 12, 14 also presents a flange 42 integral with the body 12, 14 with parallel threaded holes 44 equally spaced about its axis 96, 97; and an annular body 46 substantially identical to flange 42 and presenting a central hole by which to fit body 46 on to portion 36. More specifically, once fitted on to portion 36, saw 16, 18 is retained in position by body 46 and by screws 48 screwed inside holes 44 to clamp body 46 against flange 42. As such, saw 16, 18 and body 12, 14 form a tool 49 presenting two connecting shanks, a first of which is conical and defined by portion 38, and a second of which is cylindrical and defined by portion 40.

With reference to FIGS. 2 and 3, device 24 comprises a turret 50 fitted to a vertical shaft 50a, which is freely movable axially and rotated angularly about a respective longitudinal axis 51 (FIG. 3) by a respective actuating member 52 (shown by the dotted line in FIGS. 2 and 3); and turret 50 presents, on opposite sides, two toolholder gripping heads 53 located along an axis 54 perpendicular to axis 51.

Figure 4:
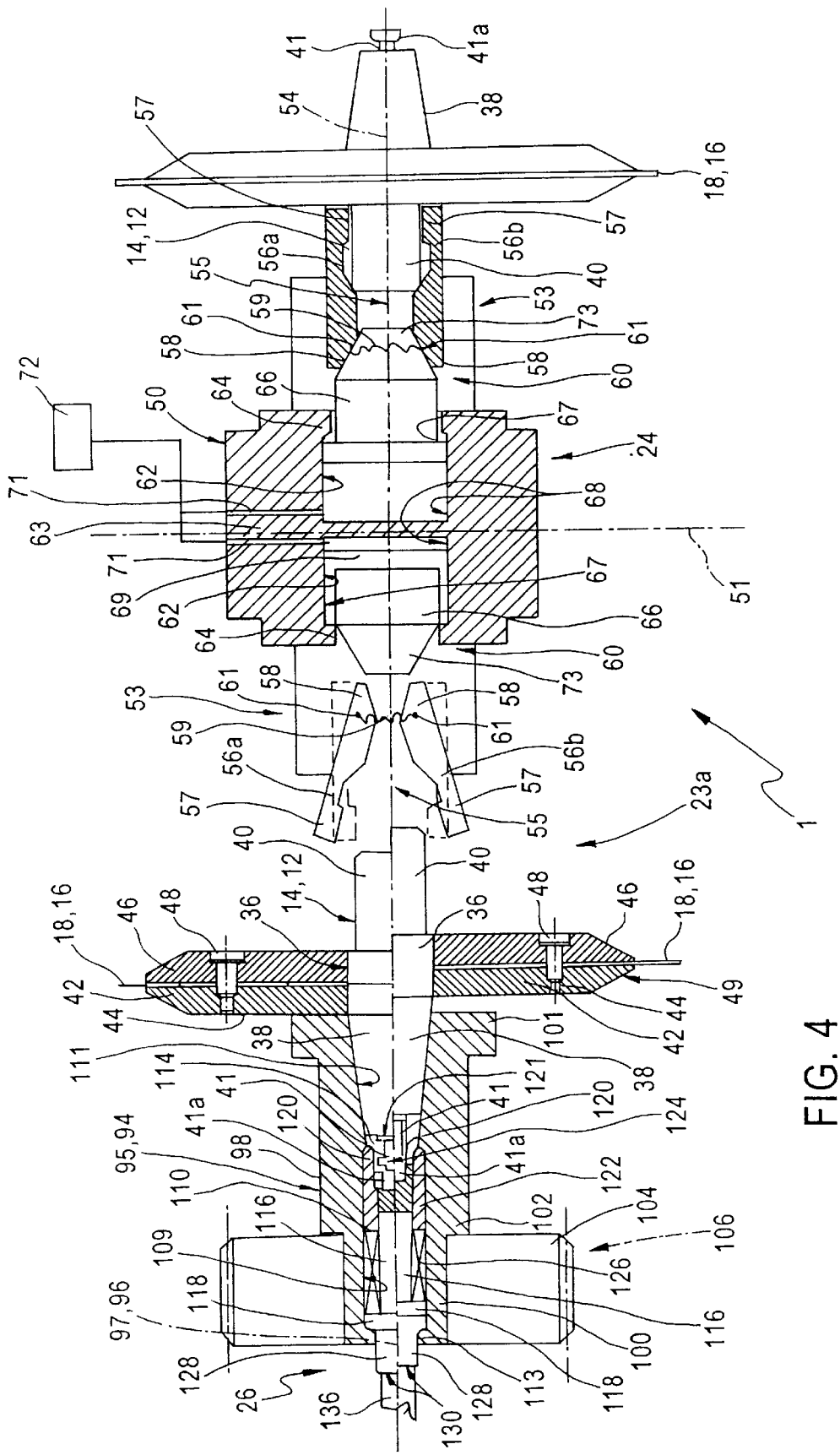
FIG. 4 shows a larger-scale, partially sectioned plan view, with parts removed for clarity, of FIG. 2.

With reference to FIG. 4, each head 53 presents a gripper 55 in turn presenting at least two gripping arms 56a and 56b hinged by respective intermediate portions to the body of turret 50 and on either side of axis 54. Each arm 56a, 56b presents an outwardly-facing gripping end 57 defined, on the axis 54 side, by a substantially cylindrical surface to enable head 53 to cooperate with portion 40 of a body 12, 14; and, at the opposite end to end 57, each arm 56a, 56b presents an appendix 58 defined internally by a substantially conical surface, and a hole 61 for the connection of a helical traction spring 59 for drawing appendixes 58 of arms 56a and 56b towards each other. Turret 50 also comprises a pneumatic closing device 60, which, for each of grippers 55, comprises an outwardly-open cylindrical cavity 62 coaxial with axis 54 and separated from the other cavity 62 by a partition 63. Each cavity 62 is defined, at the gripper 55 end, by an annular projection 64 with an inside diameter smaller than that of cavity 62, and houses a respective piston 66; each piston 66 is coaxial with axis 54, divides cavity 62 into two chambers 67 and 68, and presents, at the partition 63 end, an end portion 69 of a diameter approximately equal to but no larger than the diameter of the cylindrical shell of cavity 62; and chamber 67 only communicates externally via an air conduit 71 for supplying chamber 67 with compressed air produced by a known pneumatic control unit 72 for moving piston 66 axially towards gripper 55.

At the gripper 55 end, piston 66 presents a conical end appendix 73, which contacts the inner surfaces of appendixes 58 to rotate arms 56a and 56b in opposite directions, depending on the traveling direction of piston 66.

Device 24 comprises an actuating assembly 75 for activating turret 50 within a substantially parallelepiped volume parallel to direction 6 and between store 19 and carriage 7 in the idle position. In other words, device 24 is a Cartesian robot, and comprises an arm 77 parallel to direction 6, made of sheet metal bent into an L and reinforced with welded ribs, and fitted in freely-sliding manner to guides 78, which are perpendicular to guide 5, are fixed in relation to frame 3, and are located at either edge of carriage 7 in the idle position. Between guides 78, assembly 75 comprises a screw-nut screw transmission 80 for moving arm 77 along guides 78, and which comprises a screw 81 parallel to guides 78, fitted to frame 3 in freely-rotating and axially-fixed manner, and activated by an electric motor 82 fitted to frame 3 at an end portion of screw 81 on the opposite side to guide 5. On the carriage 7 side, arm 77 presents a vertical wall 84 for rigidly supporting two straight guides 85 (FIG. 3) parallel to each other and to direction 6; guides 85 support in freely-sliding manner a carriage 87 supporting turret 50, housing actuating member 52, and movable from one end to the other of guides 85 by a screw-nut screw transmission 88 substantially identical to transmission 80; and transmission 88 presents a screw 89 parallel to guides 85 and activated by a motor 90 fitted integral with arm 77 on the opposite side to worktable 4.

Cutting assembly 10 comprises a pair of spindles 94 and 95 (FIGS. 2, 4), each of which supports a respective body 12, 14, presents a respective horizontal longitudinal axis 96, 97 perpendicular to direction 6, and is fitted in axially-fixed, angularly-free manner to carriage 7. For the sake of simplicity, the following description will be limited to spindle 95, which only differs from spindle 94 in terms of size.

With reference to FIGS. 2 and 4, spindle 95 comprises a hollow body 98 coaxial with axis 97 and presenting two cylindrical end portions 100, 101 coaxial with each other and with axis 97. More specifically, portion 101 is substantially a flange located on the store 19 side and presenting a larger outside diameter than portion 100. Body 98 also presents a cylindrical portion 102 coaxial with axis 97, said body 98 being located between and presents an outside diameter between those of portions 100 and 101. Portion 100 is fitted with a gear 104 driven, via a parallel-axis transmission 106, by an electric actuator 108, which therefore rotates both body 98 and spindle 95 about axis 97.

Body 98 presents a longitudinal through cavity 109 coaxial with axis 97, and in turn presenting, at portion 100 and part of portion 102, a cylindrical surface portion 110, and, at the opposite end to portion 100, a conical surface portion 111 housing portion 38 in complementary manner to impart cutting motion to saw 18. Portion 110 is defined axially by two projections 113 and 114, the second of which separates portions 110 and 111.

Portion 110 houses in axially-sliding, angularly-fixed manner a tie 116 coaxial with axis 97 and presenting, at the projection 113 end, an annular portion 118, the outside diameter of which is approximately equal to that of portion 110 to guide the tie along cavity 109. At the store 19 end, tie 116 also presents a number of elastic gripping arms 120 equally spaced about axis 97 and defining a gripper 121 for selectively engaging pin 41 and retaining respective end 41a to form a rigid connection between tool 49 and body 98. Portion 110 is fitted with a sleeve 122 contacting projection 114 and presenting a number of inner grooves 124, each of which acts as a guide for one of elastic gripping arms 120 to control the deformation of arm 120 during axial displacement of tie 116, and to prevent tie 116 from rotating about axis 97. Portion 110 also houses, between sleeve 122 and projection 113, a number of Belleville washers 126 for opposing the movement of tie 116 towards portion 101; and tie 116 presents an end portion 128 projecting from portion 100, extending from portion 118, and defined axially by a flat face 130 perpendicular to axis 97.

Control unit 26 is fitted integral with frame 3, and presents two substantially identical linear actuators 132 and 134 (FIG. 2) coaxial with respective spindles 95 and 94. Each actuator 132, 134 is operated by pneumatic control unit 72, and presents a relevant rod 136 coaxial with respective axis 96, 97, and which is movable to and from a withdrawn idle position to move respective tie 116, in opposition to washers 126, in such a manner as to open or close gripper 121 to change tool 49.

A worn saw is replaced with a sharpened or new saw as follows:

A1) a toolholder body fitted with a new saw is removed from a pocket on the pocket conveyor, whereas the carriage reaches the idle position;

A2) the toolholder body fitted with the worn saw is removed from the carriage;

A3) the turret is rotated 180°, and the toolholder body with the new saw is inserted in place of the toolholder body with the worn saw; and A4) as the cutting machine starts up again to cut the panels, the toolholder body with the worn saw is inserted inside a pocket on the pocket conveyor and conveyed to another department.

Operation of machine 1 will now be described as of the start condition, in which a pack 2a of panels 2 on worktable 4 is clamped in the cutting position by bar 15, and saw 18 is to be changed. As such, carriage 7 is stationary in the idle position; the actuators of spindles 94 and 95 are stationary; arm 77 of device 24 contacts the limit stops of guides 78; carriage 87 is in the idle position contacting the limit stop of guides 85 on the saw 18 side; store 19, by means of a respective pocket 23, supplies at least one new saw 18 substantially identical to the one on respective body 14; actuating member 52 maintains axis 54 of turret 50 coincident with axis 97 of spindle 95. Furthermore, the respective rods 136 of actuators 132 and 134 of control unit 26 are withdrawn to close gripper 121 about pin 41.

Operation of tool-change device 24 and control unit 26 is controlled by an electronic central control unit 27 (FIGS. 1, 2) for optimizing replacement of saw 18.

As stated, to change saw 18, arm 77 is moved along guides 78 by transmission 80 towards carriage 7, and, at the same time, carriage 87 is moved so that axis 54 of turret 50 is coaxial with axis 97 of spindle 95.

More specifically, operations A1–A4 are as follows:

A1) Store 19 is operated to feed a pocket 23 containing a body 14 with a new saw 18 into station 23a; arm 77 and carriage 87 are operated to bring turret 50 into station 23a with the empty gripper 55 facing the pocket 23 containing body 14 with the new saw 18; and body 14 is removed from pocket 23 as described previously.

A2) Once the gripper 55 surrounds portion 40 corresponding to the worn saw 18 to be changed, respective piston 66 of closing device 60 is operated so that portion 40 of body 14 to be removed is gripped by ends 57 of the gripper; in the meantime, control unit 26 is operated to move rod 136 of actuator 132 into contact with face 130 of respective tie 116, and so push the tie 116 towards arm 77 to open elastic arms 120, and hence gripper 121, to release pin 41; and, once pin 41 is released, arm 77 is operated to withdraw body 14 from portion 111.

A3) Actuating member 52 is operated to invert the location of grippers 55 by rotating them 180° about axis 51, so that gripper 55 containing body 14 with the worn saw 18 is located at station 23a, and gripper 55 containing the new saw 18 is located on the carriage 7 side; and finally body 14 with the new saw 18 is inserted inside the supporting members integral with carriage 7.

A4) Following operation of the various devices for inserting body 14 with the worn saw 18 inside one of the pockets 23, the worn saw 18 is disposed of by pocket conveyor 20.

The manner in which the tool defined by body 12 and saw 16 is changed is substantially the same as described above in connection with the tool defined by body 14 and saw 18, and is therefore not described for the sake of simplicity.

Once started up, machine 1 may therefore be operated uninterruptedly and with no particular assistance on the part of the operator, whose job is limited solely to changing tools 49 inside pockets 23 of store 19. As such, machine 1 may be said to present a high degree of automation.

Clearly, changes may be made to machine 1 as described and illustrated herein without, however, departing from the scope of the present invention.

For example, store 19 may, if required for reasons of space, be set up vertically as opposed to horizontally (as shown by the dotted line in FIG. 3) with no alterations to the rest of machine 1.

Moreover, store 19 may be replaced with a store presenting a fixed structure in relation to frame 3, and featuring fixed seats for tools 49. In which case, the device 24 moves along suitable guides (not shown) in order to reach store 19 remote from the cutting section.

I claim:

1. A machine (1) for cutting panels (2) and including pressure clamping devices (11) for clamping the panels (2); the machine (1) comprising:

a frame (3) having a substantially horizontal worktable (4) therein, a guide (5) fitted on the frame;

said guide extending along and beyond the worktable in a given substantially horizontal direction (6); and a carriage (7);

said machine having an idle position for said carriage located at an extended portion of the guide beyond and horizontally separated from said worktable (4);

said machine (1) further comprising a transfer station (23a) substantially at said extended portion of the guide beyond and horizontally separated from said worktable (4) and facing said idle position;

said carriage (7) fitted in freely-sliding manner to said guide (5) so as to move horizontally along the guide, in relation to said frame (3), to and from said idle position and said transfer station facing said idle position;

said carriage (7) including in freely-rotating and axially-fixed manner at least one supporting element (94, 95) having a respective first longitudinal axis (96, 97) perpendicular to said horizontal direction (6); and said supporting element (94, 95) supporting at least one cutting member (49) having a circular saw (16, 18) which is moved by said carriage;

pickup means (24) located at said transfer station (23a) and horizontally separated from said worktable (4) for automatically replacing a damaged cutting member (49) with a new cutting member (49); and actuating means (26) cooperating selectively with said supporting element (94, 95) and with said pickup means (24), for selectively releasing said cutting member (49) from said supporting element (94, 95) and enabling replacement of said cutting member (49).

2. A machine as claimed in claim 1, further comprising a tool store (19), provided with at least one hollow element (23), facing said pickup means (24).

3. A machine as claimed in claim 2, wherein an elongated support body (12, 14) of each said circular saw (16, 18) has a first end portion (38) and a second end portion (40) respectively located on either side of an intermediate portion (36), wherein each of said first and second end portions has a given shape;

said pickup means (24) comprising gripping means (53) and a transfer device (75) supporting said gripping means (53), to grip said elongated support body (12, 14) by a respective second end portion (40) thereof;

said pickup means (24) substantially facing said carriage (7) in said idle position beyond said worktable (4) to move said gripping means (53) into said transfer station (23a) between said carriage (7) in said idle position and said tool store (19).

4. A machine as claimed in claim 3, wherein said gripping means (53) comprises at least two gripping heads (53), each having a gripper (55) and a pneumatic member (60) for actuating said gripper (55).

5. A machine as claimed in claim 4, wherein said two gripping heads (53) are coaxial and arranged at 180° to each other.

6. A machine as claimed in claim 5, wherein:

said pickup means (24) comprises a support (50a) having a further longitudinal axis (51) substantially perpendicular to said horizontal direction (6) for supporting said gripping means (53);

said pickup means (24) also comprising a first actuator (52) connected to said support (50a) for moving said gripping means (53) along, and selectively rotating said gripping means (53) about, said further longitudinal axis (51).

7. A machine as claimed in claim 6, further comprising a plurality of supporting elements (94)(95) each having a hollow body (98) coaxial with a corresponding respective first longitudinal axis (96)(97) and having a flange (101) facing said tool store (19), and a substantially cylindrical-ended first cylindrical portion (100) at an opposite end to said flange (101);

said hollow body (98) having, between said flange (101) and said first cylindrical portion (100), a second cylindrical portion (102) of a diameter between diameters of said flange (101) and of said first cylindrical portion (100);

said carriage (7) having, for each of said supporting elements (94, 95), a second actuator (108) and a first transmission (106) cooperating with each other to rotate said hollow body (98).

8. A machine as claimed in claim 7, wherein each of said supporting elements (94)(95) comprises, inside the respective hollow body (98), a seat (111) facing said tool store (19) for receiving said first end portion (38) of said elongated support body (12, 14); and retaining means (116) activated selectively, in opposition to a thrust of an elastic device (126), to establish an axial connection between said cutting member (49) and said hollow body (98).

9. A machine as claimed in claim 8, wherein said actuating means (26) is located on a side of said carriage (7) opposite to said tool store (19); said actuating means (26) actuating said retaining means (116).

10. A machine as claimed in claim 9, wherein said retaining means (116) comprises a tie (116) housed in angularly-fixed, axially-sliding manner inside each said hollow body (98);

said tie (116) having, at an end facing said tool store (19), a second gripper (121) for gripping said elongated support body (12, 14) by said first end portion (38) to rigidly connect said cutting member (49) and said hollow body (98), said second gripper being elastic.

11. A machine as claimed in claim 10, wherein said elastic device (126) is housed inside said hollow body (98), and comprises a plurality of Belleville washers (126) coaxial with the tie (116) and for pushing the tie (116) towards said actuating means (26);

said actuating means (26) comprising a third actuator (132)(134) for each said hollow body (98);

each said third actuator (132)(134) having a respective rod (136) coaxial with said tie (116) and movable to and from a withdrawn position to move said tie (116) in opposition to a thrust of said Belleville washers (126) and to open said second gripper (121).

12. A machine as claimed in claim 6, wherein said pickup means (24) farther comprises a turret (50), first actuating means (88, 90) for moving said turret (50) parallel to the horizontal direction (6), and second actuating means (81, 82) for moving said turret perpendicular to said horizontal direction (6).

13. A machine as claimed in claim 2, wherein an elongated support body (12, 14) of said saw (16, 18) has a first end portion (38) and a second end portion (40) respectively located on either side of an intermediate portion (36), wherein each of said first and second end portions has a given shape;

said pickup means (24) comprising gripping means (53) and a transfer device (75) supporting said gripping means, to grip said elongated support body (12, 14) by said second end portion (40);

said tool store (19) being fixed in relation to said frame (3) placed in a remote position from said carriage (7), said pickup means (24) being able to move on suitable guides between said carriage (7) and said tool store (19).

14. A machine as claimed in claim 2, wherein said tool store (19) comprises a conveyor (20) extending parallel to said horizontal direction (6) and having a belt (21);

said conveyor (20) having at least one said hollow element (23) integral with said belt (21) and open towards said carriage (7) to receive said cutting member (49) perpendicularly to said horizontal direction (6).

* * * * *